Aug. 8, 1967 A. P. JACKEL 3,335,227

COORDINATION OF TELEPHONE AND REMOTE CONTROL TRANSMISSION OVER A COMMON COMMUNICATION CHANNEL

Filed Oct. 16, 1963 2 Sheets-Sheet 1

Aug. 8, 1967 A. P. JACKEL 3,335,227

COORDINATION OF TELEPHONE AND REMOTE CONTROL TRANSMISSION OVER A COMMON COMMUNICATION CHANNEL

Filed Oct. 16, 1963 2 Sheets-Sheet 2

United States Patent Office 3,335,227
Patented Aug. 8, 1967

3,335,227

COORDINATION OF TELEPHONE AND REMOTE CONTROL TRANSMISSION OVER A COMMON COMMUNICATION CHANNEL

Arthur P. Jackel, Penn Hills Township, Allegheny County, Pa., assignor to Westinghouse Air Brake Company, Swissvale, Pa., a corporation of Pennsylvania
Filed Oct. 16, 1963, Ser. No. 316,735
6 Claims. (Cl. 179—2)

ABSTRACT OF THE DISCLOSURE

Coordination circuit arrangement permitting common use of a voice frequency communication channel by telephone network and voice frequency carrier current remote control system. The latter is normally active, the telephone network normally disconnected. A transfer action to substitute the telephone network is initiated from the control office by removal of telephone handset from hook switch. Control system operation at office is then inhibited at a preselected point in the cycle. When this inhibit action is detected at each station, a similar inhibit condition is actuated. Telephone apparatus connections at each location are prepared only when the local inhibit condition is effective. A timing means periodically restores control system operation for a single cycle to update indications and alarms.

My invention pertains to the coordination of telephone and remote control system transmission over a common communication channel. More specifically, this invention is related to an arrangement for coordinating the use of a single voice frequency communication channel by a voice frequency telephone network and a remote control system using carrier currents in the voice frequency range.

In the use of remote control systems for consolidating the control of apparatus located at several separated and remotely located stations, a communication circuit for maintenance purposes is normally required. In general, however, such a circuit is subject to relatively infrequent use, particular from the unattended remote stations. Also, in many such remote control installations, leased commercial circuits are used for the communication channel over which the control and indication functions are transmitted between the control office and the remote stations. Such circuits are leased in accordance with the type or character of transmission utilized by the remote control system for its transmissions. Obviously, it is difficult to economically justify the leasing of a separate maintenance communication channel which will be relatively infrequently used. Under such conditions, it becomes advantageous to use a remote control system designed to utilize voice frequency carrier currents transmitted as pulses on a continuously scanning basis. The leased commercial circuit can then be of the type designed for voice frequency transmission only. This same circuit can thus also be used for a maintainer's telephone circuit. However, it is obvious that such composite use requires coordination since telephone transmissions will interfere with the remote control system operation. In designing the coordination arrangement where a continuous scanning operation is utilized to provide rapid transmission of changes in the indication functions, the remote control system is normally in its active or operating condition over the communication channel. The maintainer's telephone circuit is then arranged to be substituted, that is, connected to the communication channel in place of the remote control system, only when needed for maintenance communications. However, at the same time, the arrangement must prevent the use of the telephone circuit from indefinitely blocking transmissions by the remote control system. In other words, the periods of use of the maintainer's telephone circuit should not be continuous but should be automatically broken into specifically timed periods which are separated by short periods of operation by the remote control system.

Accordingly, an object of my invention is a coordination arrangement for a remote control system and a telephone network using a common communication channel.

Another object of my invention is an arrangement for coordinating the use of a single, voice frequency communication channel by a telephone network and a continuously scanning remote control system using voice frequency carrier currents.

A further object of my invention is a coordination arrangement which allows a remote control system using voice frequency currents and a telephone network to utilize a common communication channel without mutual interference.

Still another object of my invention is an arrangement for temporarily substituting a telephone network as the sole user of a voice frequency communication channel in lieu of the continuously scanning voice frequency carrier current remote control system normally using that channel.

It is also an object of my invention to provide a coordination arrangement for a voice frequency remote control system and a telephone network using a common communication channel, which arrangement connects the telephone network to the channel and locks out the remote control system for predetermined time periods when use of the telephone network is desired.

Other objects, features, and advantages of my invention will become apparent from the following specification when taken in connection with the accompanying drawings.

I shall now describe the invention, first generally, and then in detail, following which I will point out the novel features thereof in the appended claims. In describing my invention, reference will be made to the accompanying drawings in which:

Figure 1:
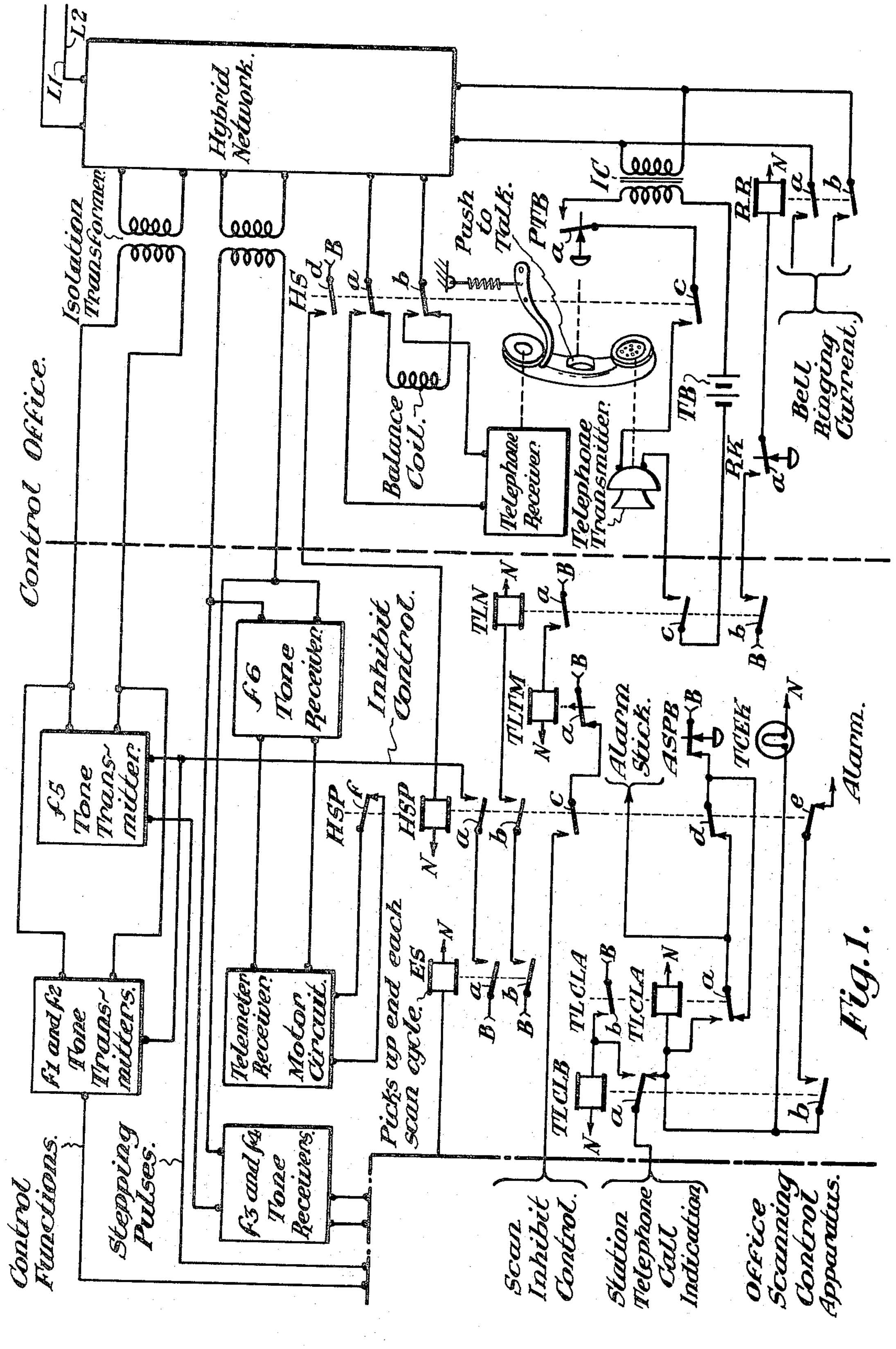
FIG. 1 is a diagrammatic illustration of a circuit arrangement, at the control office of the remote control system, which embodies one form of the coordination circuit arrangement of my invention.

In each of the drawings, similar reference characters are used to designate similar parts of the apparatus. It is further pointed out that conventional symbols have been used throughout the drawings in order to simplify the illustration of the form of my invention disclosed. Further, at each location illustrated, a local source of direct current energy is provided for energizing relays and such other apparatus as may be required. Since the use of a direct current source is well known and any one of several different types may be used, the actual source is not specifically illustrated. However, connections to the positive and negative terminals of this direct current source are designated by the use of reference characters B and N, respectively, throughout the drawings.

In practicing my invention, at least for the purpose of a specific disclosure herein, the remote control system is of the continuously scanning type with the code transmision being by pulses of voice frequency carrier currents which are generated for control function purposes at the control office and for indication functions at the various remote stations. A single communication channel connects the control office and all of the station locations. This circuit is designed for voice frequency transmissions and thus is suitable also for voice telephone use. The remote control system is normally active, that is connected to the line circuit for the continuous transmission of control and indication functions from and to the office location, respectively, in continuously recurring scanning cycles. In addition, stepping pulses to drive the scanning apparatus at each location in the form shown are continuously transmitted from the office location. Separate and distinct voice frequency carrier current circuits are provided in each direction to carry these transmissions. It is assumed that the necessary frequency assignments cover a major part of the voice frequency band generally considered available for such use. In addition to the remote control system, a voice telephone network is provided with a telephone instrument at each location, that is, the control office and each remote station. These instruments or apparatus are normally disconnected from the communication channel and thus are nonactive so that no interference with the operation of remote control system can occur.

To initiate a telephone call from the office location in the form illustrated, the telephone handset is lifted from a hook switch upon which it normally rests. This hook switch is provided with various contacts, at least some of which close when the hook switch is released by the removal of the telephone. The operation of the hook switch immediately connects the telephone receiver to the communication channel and makes initial preparations for connecting other circuits such as a ringing circuit and the telephone transmitter. At the same time, a repeater relay for the hook switch is energized. At the end of the existing remote control system scanning cycle, with the repeater relay of the hook switch energized, a telephone line connection relay is energized in response to the final step of the scanning cycle. At the same time, in cascade, this line connection relay energizes a repeater or timing relay which has a preset timing period. In addition, the line connection relay completes the connections of the telephone transmitter to the communication channel and other connections which provide for the transmission of ringing current over the channel. Meanwhile, with the hook switch repeater relay previously energized, the occurrence of the end of the scanning cycle of the remote control system completes various inhibit circuits, one of which prevents or halts the scanning action of the office control apparatus beyond this final step of the scanning cycle. In addition, inhibit circuits are completed to turn off, that is, to halt transmission by, the voice frequency carrier current (tone) transmitters of the remote control system.

In the system illustrated, a monitor relay is provided at each station which detects this absence of the voice frequency carrier currents normally transmitted from the office. Specifically, in the form shown, this relay monitors the stepping pulse carrier current transmission. When this selected signaling condition, i.e., continued absence of carrier current, is detected, the monitor relay actuates the completion of various inhibit circuits at the station location, particularly to inhibit the transmission of the voice frequency carrier currents which carry the indication functions to the office. The monitor relay also actuates the preparation of circuits to connect the telephone apparatus to the communication channel, specifically, the telephone transmitter. When a call signal is received from the office location that telephone conversation is desired which in this specific arrangement, is illustrated by a standard telephone ringing arrangement, the telephone handset at the selected station is removed from a corresponding hook switch. This removal releases the hook switch and its contacts connect the telephone receiver directly to the communication channel. This action also completes connections for the telephone set transmitter.

However, as specifically shown at each location, a push-to-talk button provided in the telephone handset must be operated when an individual wishes to speak over the telephone network. This push-to-talk button or switch finally completes the telephone transmitter connections to the communication channel. If the situation is such that an individual at a remote station desires to initiate use of the telephone network, removal of the telephone set from the hook switch at that location actuates the transmission of a telephone call request indication over the remote control system during the existing scanning cycle. The operator at the control office, in response to the reception of this signal, removes his handset from the hook switch and the coordination arrangement functions exactly as previously described, inhibiting part of the operation of the remote control system and completing the connection for the telephone network to the communication channel.

Figure 2:
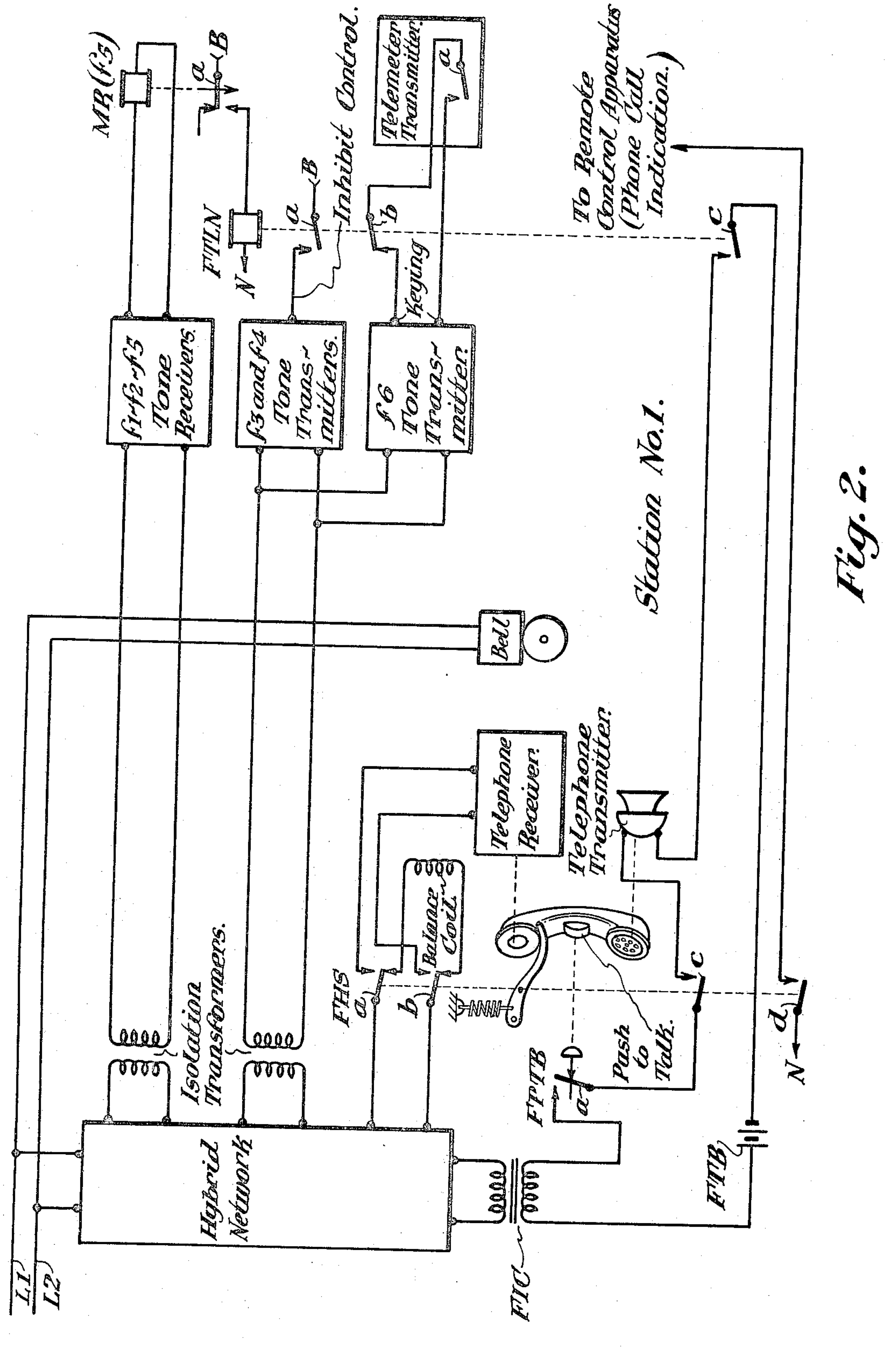
FIG. 2 is a similar illustration of the circuits at one of the remote field station locations of the remote control system, which circuit arrangement cooperates with the office circuits of FIG. 1 and also embodies the one form of the coordination circuits of my invention.

Referring to the drawings, I shall now describe the specific form of my invention illustrated herein. These drawings show the control office and the No. 1 station, in FIGS. 1 and 2, respectively, of a multi-station remote control system. This office and the various stations are connected by a communication channel which is illustrated specifically as a two wire line circuit designated by the reference characters L1 and L2. Connections to this line circuit may be seen in the upper right portion of FIG. 1 and the upper left of FIG. 2. This communication channel or line circuit is adapted or designed for voice frequency current transmission and is assumed to be a leased commercial circuit. The actual details of the circuit are not necessary for an understanding of the present invention. In actual practice, the specific details of the leased commercial circuit would not necessarily be known to the users thereof, only the terminal connections being provided by the leasor of the circuit. Thus, the conventional connections L1 and L2 illustrated in FIGS. 1 and 2 are in keeping with those encountered in actual practice. The design specifications which must be met are that the communication channel be suitable for voice frequency current transmission and that the control office and various stations be connected in multiple arrangement. It is to be understood that the connections and arrangement at the other remote field stations of the system are identical with those shown in FIG. 2 for station No. 1.

To provide a specific remote control system for background of this detailed description, it is assumed that the system is similar to that disclosed in Letters Patent of the United States No. 3,035,248 issued May 15, 1962, to B. H. Grose and S. L. Hurst for Remote Control Systems. The specific showing in this reference patent is of a single station, continuous scan system with carrier current pulse transmission between the office and the station. However, this single station system can readily be expanded into a multi-station system as shown in the copending application for Letters Patent of the United States Ser. No. 815,647, filed May 25, 1959 by J. P. Coley et al., for Remote Control Systems, now Patent No. 3,122,723, issued Feb. 25, 1964, these reference patents having the same assignee as the present application. The office portion of the remote control systems is shown in conventional manner by a dot-dash rectangle, at the left of FIG. 1, designated as the office scanning control apparatus. In addition, various carrier current transmitters and receivers are shown by conventional blocks in the upper left of FIG. 1. In illustrating this apparatus used by the remote control system, few details are shown, actually only those necessary for an understanding of the present invention. At the single station illustrated in FIG. 2, even fewer details of the remote control system apparatus are necessary for an understanding of the present arrangement. If complete details and circiutry of this background remote control system and a full understanding of the operation thereof are desired, reference is made to the aforementioned patents for such specific details. It is to be understood that my invention is adaptable to other types of remote control systems and the necessary modifications for such adaptation are considered to be included in this invention.

The carrier transmitters and receivers are shown in conventional manner since any type known to the art may be used for this purpose. It is here specified that the frequency of the carrier currents used in the present arrangement are within the voice frequency range and therefore the transmitters and receivers are indicated as tone transmitters and tone receivers to designate the voice frequency range. Each carrier current circuit provided is of a different and distinct frequency, which are designated in conventional manner by the numerical suffix added to the general reference character $f$ indicating the frequency of a carrier current circuit. Thus, the tone transmitter providing the stepping pulses for the continuous scanning operation of the system is designated as the $f_5$ tone transmitter. This carrier current transmitter is assumed to be normally active, that is, to be generating carrier current of its assigned frequency as controlled by the office scanning apparatus to transmit stepping pulses. This control is illustrated by the conventional connection from the dot-dash rectangle indicating the control apparatus to the $f_5$ tone transmitter. Where the conventional block designating a tone transmitter is provided with two designated frequencies, such as the $f_1$ and $f_2$ tone transmitters in the upper left of FIG. 1, one or the other carrier current of these frequencies is continuously transmitted under the control of the scanning apparatus while the remote control system is active. The same is true for the control at the station location of the transmission of carrier currents of frequencies $f_3$ and $f_4$.

However, the $f_6$ tone transmitter shown at station No. 1 in FIG. 2 is active, that is, is transmitting carrier current of that frequency only when its keying circuit connected across the so designated terminals is closed. The $f_6$ tone transmitter is provided to transmit telemeter information from the field station to the office. This arrangement is added to the basic remote control system to illustrate how such an additional circuit may also be controlled in the coordination arrangement. The telemeter transmitter shown conventionally at the field station at the right in FIG. 2 is of the analog type, well known in the art, and carrier current is transmitted in accordance with the period of time that the telemeter transmitter contact $a$ is closed. When carrier current of frequency $f_6$ is received by the corresponding tone receiver at the office, the telemeter receiver, also shown by a conventional block, is driven, to provide an indication of the signal received, as long as its motor circuit, connected across the so designated terminals of the conventional block, is closed. The external controls of the $f_6$ tone transmitter used for telemeter transmissions and the controls for the telemeter receiver will be discussed hereinafter in the description. It is to be understood that, in the conventional showing of the various tone transmitters and tone receivers, the necessary power supply for energizing such apparatus and suitable filters for connecting the units to the communication channel are assumed to be part of the conventional blocks shown.

To the right of the vertical dot-dash line in FIG. 1, the telephone apparatus provided at the office location is centered about the schematic representation of the telephone handset on the hook switch arm. This hook switch, designated as HS, is provided with four sets of contacts which close in the upper position when the telephone handset is removed from the hook switch arm. This telephone apparatus, as well as the remote control apparatus, is connected to the communication channel, designated as line circuit L1, L2 in the upper right, through a hybrid network shown by conventional block diagram, such networks being conventional in the telephone art. Such networks are used, as is well known in the art, for line balancing purposes where several types of connections or several tyes of apparatus are to be connected to the communication channel.

As specifically shown, the conventional telephone receiver, shown by the so-designated block, is connected to the hybrid network over the upper points of contacts $a$ and $b$ of hook switch HS. With the handset on the hook, the closing of the lower points of contacts $a$ and $b$ connects a balancing coil across the hybrid network terminals in a conventional manner to retain a balanced load on the network. Connections from the conventional telephone transmitter of the handset to the hybrid network include an induction coil designated IC. The secondary winding of this induction coil is connected directly across terminals of the hybrid network. The circuit for the primary winding of coil IC may be traced from the positive terminal of transmitter battery TB through the primary winding, a normally open contact $a$ of push-to-talk button PTB of the handset, upper contact $c$ of hook switch HS, the telephone transmitter, front contact $c$ of telephone line connection relay TLN, to be discussed shortly, and returning to the negative terminal of battery TB. To provide a means of signaling the telephone apparatus at the various remote stations, a source of bell ringing current is connected to the hybrid network over front contacts $a$ and $b$ of the ring relay RR, shown in the lower right of FIG. 1. Relay RR is controlled by a circuit extending from terminal B of the source over front contact $b$ of relay TLN, normally open contact $a$ of ring key RK, and through the winding of relay RR to terminal N of the source. As a specific example, the source of bell ringing current may provide energy at a low frequency such as 20 cycles. It is to be noted that the tone transmitters and receivers of the basic remote control system are connected through isolation transformers to the hybrid network and thus to the communication channel L1, L2.

To the left of the vertical dot-dash line is shown the various supervisory apparatus which is added to the basic remote control system in order to provide the coordination arrangement of my invention. The end of scan relay ES is provided to indicate the end of each scanning cycle of the control apparatus. This relay, as indicated by a note on the drawing, is energized and picks up at the end of each scan cycle, that is, during the final code step of a scan cycle just prior to the reset of the control apparatus to its initial position. It may be noted that, as long as this scanning control apparatus remains in this final step condition, relay ES will remain energized. It is to be understood that the function of relays ES may be performed by a relay or other apparatus within the control apparatus. However, it is here shown as an added and distinct relay outside the control apparatus for convenience and for clarity in understanding its operation.

The hook switch repeater relay HSP is provided to repeat the release of the hook switch upon the removel of the telephone handset. This relay is provided with a simple energizing circuit including the upper point of contact $d$ of hook switch HS and the winding of rely HSP itself, the circuit extending between terminals B and N of the source. Relay HSP is thus energized as soon as the hook switch is released by the removal of the telephone handset. The telephone line connection relay TLN is provided with an energizing circuit including front contacts $b$ of relays ES and HSP. Thus relay TLN is energized, if relay HSP is picked up, when the end of the existing scanning cycle is reached so that relay ES likewise picks up. As soon as front contact $a$ of relay TLN closes, the obvious energizing circuit for the telephone line timer relay TLTM is completed. This later relay is provided with slow pick up characteristics which may be preset for a selected period of time. At the expiration of this period of time, the relay picks up its armature so that the illustrated back contact $a$ is open.

The coordination arrangement includes an inhibit circuit for the office scanning control apparatus, the purpose of which is to halt the scanning or stepping action at the end of a particular scanning cycle, that is, when the apparatus is in the condition it assumes during the final step of that cycle. This circuit is shown conventionally as including back contact *a* of relay TLTM and front contact *c* of relay HSP. When this circuit is complete, energy from terminal B is provided to the control apparatus to actuate the inhibit action so that the stepping action halts at the end of that scanning cycle. Under these conditions, as previously indicated, relay ES will remain energized. Another inhibit circuit is provided for the tone transmitters of the remote control system. This is shown conventionally as extending from terminal B over front contacts *a* of relays ES and HSP to the $f_5$ tone transmitter and the $f_1$, $f_2$ tone transmitters. When this circuit is complete so that energy from terminal B is supplied to the tone transmitters, the transmission of the corresponding carrier current at the designated frequency is halted. The actual circuit connections will be such as are required by the carrier apparatus in actual use in order to achieve the desired results. Specifically, although stepping pulses may continue to be supplied over the conventional connection shown from the control apparatus to the $f_5$ tone transmitter, carrier current pulses of that frequency will not be transmitted over the communication channel during such period as this inhibit circuit is complete.

The office is also provided with specific registry circuits for receiving a telephone call request indication from any of the stations. When such an indication is received, specifically from station No. 1 shown in FIG. 2, the control apparatus supplies energy to the energizing circuit for the telephone line call relay TLCLA. This circuit includes back contact *a* of a second telephone line call relay TLCLB. Thus, when a telephone call request is received during the scanning action, relay TLCLA is energized and picks up. Relay TLCLB is provided with an energizing circuit including front contact *b* of relay TLCLA so that these two relays pick up in cascade upon the reception of such an indication. The closing of front contact *a* of relay TLCLB completes a stick circuit for this relay from the scanning control apparatus circuit. This stick circuit will hold relay TLCLB energized during the next scanning cycle if the transfer to the telephone network is not yet completed.

A stick circuit for relay TLCLA includes normally closed contact *a* of the alarm silencing pushbutton ASPB, back contact *d* of relay HSP, and front contact *a* and the winding of relay TLCLA. Energy over this circuit is also supplied to energize the telephone call indication lamp TCEK, the connection extending from the left terminal of the winding of relay TLCLA through the lamp to terminal N. Similarly, energy is supplied to the circuit extending to an audible alarm device, this circuit continuing from the left terminal of the winding of relay TLCLA over front contact *b* of relay TLCLB and back contact *e* of relay HSP. This alarm circuit, of course, is interrupted, that is, the alarm will be silenced, by operation of pushbutton ASPB to open its contact *a*. This circuit is also interrupted upon the energization and pickup of relay HSP to open its back contact *d*. However, this latter action will not occur if relay TLCLA is released so that its back contact *a* provides a by-pass around back contact *d* of relay HSP to the alarm stick circuit. This arrangement is utilized during periods of operation of the telephone network to hold alarms which are periodically received, as will be subsequently explained.

At each station of the system, of wihch station No. 1 shown in FIG. 2 is representative, telephone apparatus is also provided with a coordination circuit arrangment as will now be described. In FIG. 2, the telephone apparatus, of course, is based around the schematic representation of a telephone handset mounted or resting on a hook switch arm, the hook switch being designated by the reference character FHS. This hook switch arm controls four set sof contacts which are normally closed in their lower position if such exist and are closed in the upper position when the handset is removed from the hook switch arm. Again, the telephone apparatus and the remote control system apparatus are connected to the communication channel, represented by line circuit L1, L2, through a hybrid network similar to that provided at the office location. For example, it is to be noted that the tone transmitters and receivers of the remote control system are separately connected to the hybrid network through isolation transformers and thence from the hybrid network to the communication channel.

The telephone receiver shown conventionally is connected to hybrid network terminals over upper contacts *a* and *b* of hook switch FHS, these contacts being closed when the hook switch is released. When the telephone apparatus is disconnected, that is, the hook switch is in its lower position, a balancing coil similar to that at the office is connected to these terminals of the hybrid network over contacts *a* and *b* of hook switch FHS. The telephone transmitter, shown conventionally, is provided with a circuit which may be traced from the positive terminal of the station transmitter battery FTB through the primary winding of induction coil FIC, normally open contact *a* of the field push-to-talk button FPTB, upper contact *c* of hook switch FHS, the telephone transmitter, front contact *c* of a field telephone line connection relay FTLN, and returning to the negative terminal of battery FTB. The secondary winding of coil FIC is connected directly to terminals on the hybrid network and thence to the communication channel for transmission of the speech currents over the line. It is to be noted that a bell device is connected directly to the communication channel L1, L2 to receive the ringing signals, transmitted from the office location, designating a telephone call for this station.

Each station location is provided with a monitor device, here shown as relay MR, which is used to detect the reception of carrier currents from the control office of the remote control system. A parenthetical note designates that monitor relay MR is detecting the reception of carrier current of voice frequency $f_5$. This is the system stepping frequency and is normally continuously transmitted from the office location as stepping pulses to drive the remote control system. The winding of relay MR is connected directly across appropriate terminals on the $f_5$ tone receiver. Since the carrier current is received in pulse form, this relay is provided with a short slow release period in order to bridge the normal off periods of carrier current. Relay MR is thus released only when carrier current of frequency $f_5$ is absent from the line circuit for longer than the usual off periods during the stepping action. It is to be understood that, with another type of remote control system, the station monitor device may be required to detect a form of special signal other than absence of carrier current. Each station is provided with a field telephone line connection relay FTLN which repeats the release of relay MR, the obvious circuit including back contact *a* of relay MR and the winding of relay FTLN. Relay FTLN is thus energized and picks up when relay MR releases to indicate the absence of carrier current.

Each station is provided with apparatus to control the local scanning action for operation of the remote control system. However, it is not considered necessary to show such apparatus since the details thereof do not enter into the operation of the arrangement of my present invention. Station apparatus, of course, is driven by the stepping pulses transmitted from the office over the $f_5$ tone circuit. A partial circuit is conventionally shown, including upper contact *d* of hook switch FHS, which provides for the transmission of an indication, requesting a telephone conversation with the office, by a maintainer at the local station. When this circuit is completed by removal of the telephone handset from the hook switch, the remote control system transmits such a request indication to the office location.

An inhibit circuit for tone transmitters $f_3$ and $f_4$ is provided over front contact *a* of relay FTLN. Operation is similar to that defined for the office location transmitters. When energy from terminal B is provided over closed front contact *a* of relay FTLN, transmission of carrier current by the tone transmitters is halted. An arrangement for telemeter transmission is shown, the circuit over the communication channel being provided by the $f_6$ tone transmitter. This telemeter arrangement is of the analog type and a keying circuit for the tone transmitter, connected across the correspondingly designated terminals, includes back contact *b* of relay FTLN and contact *a* of the telemeter transmitter unit. This latter contact is periodically closed to transmit the desired information to the office. The inhibit control for this tone transmitter, that is, for the telemeter transmission arrangement, is provided by back contact *b* of relay FTLN which opens to interrupt the keying circuit during such period as transmissions are to be halted.

I shall now describe the operation of the arrangement of my invention, making reference to specific circuits previously traced in the preceding paragraphs. It is assumed that the system operator at the control office desires to make a telephone call to a maintainer presently located at station No. 1 of FIG. 2. The system operator initiates the action by removing the telephone handset from the hook switch arm at the office location. This releases the hook switch HS so that contacts controlled thereby close in their upper position. The closing of upper contacts *a* and *b* of the hook switch completes the connections for the telephone receiver to the hybrid network and thus to the communication channel. At this time, the operator may hear tones over his telephone receiver coming from the various tone transmitters of the remote control system as the scanning action continues to complete the transmission of control and indication functions and telemeter information over the communication channel. Upper contact *c* of hook switch HS at this time partially prepares a circuit for the telephone set transmitter which is completed at a later time. Upper contact *d* of hook switch HS completes the circuit for its repeater relay HSP which is energized and picks up.

The closing of front contact *c* of relay HSP completes the scan inhibit control circuit to the control apparatus at the office, thus preparing the apparatus to halt its scanning action on the last step of the existing cycle. When the scanning control apparatus reaches this last step of the cycle, relay ES is energized and picks up. With front contacts *b* of both relay ES and relay HSP now closed, relay TLN is energized and picks up, completing the circuit for energizing timer relay TLTM, which starts its timing cycle. Front contacts *a* of relays ES and HSP complete the inhibit circuit for the tone transmitters so that the transmission of tones of frequencies $f_1$, $f_2$ and $f_5$ over the communication channel halts at this time. It is to be noted also that back contact *f* of relay HSP opens to interrupt the motor circuit for the telemeter receiver. Operation of this apparatus also halts at this time, the existing reading being held until further operation is resumed when normal conditions are restored. Back contacts *d* and *e* of relay HSP also open the various alarm circuits previously described.

The pickup of relay TLN, in addition to causing the energization of relay TLTM, closes its front contact *c* to further prepare the circuit for the telephone transmitter. This circuit is now ready for use, requiring only the operation of pushbutton PTB by the operator when it is desired to transmit speech currents over the communication channel. Front contact *b* of relay TLN prepares the circuit for ring relay RR which may now be energized by actuating ring key RK to close its contact *a*. When relay RR, thus energized, picks up, it closes its front contacts *a* and *b* to connect the source of bell ringing current through the hybrid network to the communication channel. As previously mentioned, this source may provide energy at the conventional frequency of 20 cycles. Bells at the various stations will respond to the transmission of such ringing current over the line and code signals may be preselected to designate the desired station.

At the station in FIG. 2, with the removal of carrier tone $f_5$, relay MR is deenergized. Its release, to detect the receipt of this special condition or preselected signal from the office, occurs shortly since the slow release period of this relay is relatively brief. The closing of back contact *a* of relay MR completes the energizing circuit for relay FTLN which then picks up. The closing of front contact *a* of this latter relay completes the inhibit circuit for the $f_3$ and $f_4$ tone transmitters so that such carrier currents are removed from the communication channel. The keying circuit for the $f_6$ tone transmitter of the telemeter arrangement is interrupted at back contact *b* of relay FTLN and this current is also removed from the communication channel. The closing of front contact *c* of relay FTLN prepares the circuit for the telephone transmitter of the local handset.

At the selected station, here assumed to be that of FIG. 2, the bell signals received over the communication channel designate a request for a telephone conversation and the maintainer at that location responds by removing the telephone handset from the hook switch arm. Hook switch FHS thus operates to close its contacts in their upper position. The telephone receiver of the handset is immediately connected to the hybrid network over upper contacts *a* and *b* of switch FHS, this operation being similar to that at the office. Upper contact *c* of switch FHS further prepares the circuit for the telephone transmitter, the circuit now being complete except for operation of the push-to-talk button FPTB by the local maintainer during the periods when he desires his speech to be transmitted over the channel. Although upper contact *d* of switch FHS prepares the indication circuit previously described, it has no value at this time since the telephone network is already prepared for use. The operator at the control office and the maintainer at the selected station may then carry on such telephone conversation as is required in the conduct of their business, each operating his associated push-to-talk button during the periods when he is speaking.

At the office location, meanwhile, timer relay TLTM continues its timing action as its energization continues. At the end of some selected period, for example, 30 seconds in one system, relay TLTM picks up its armature, opening its back contact *a* to interrupt the inhibit circuit for the office scanning control apparatus. This releases the apparatus so that it resets and initiates a new scanning cycle. As soon as the apparatus is reset, relay ES is deenergized and releases, opening its front contacts *a* and *b*. The opening of front contact *a* interrupts the inhibit circuit for the tone transmitters and this apparatus resumes the transmission of the tone currents for operation of the remote control system. The opening of front contact *b* of relay ES interrupts the circuit for relay TLN which immediately releases. The opening of front contact *c* of relay TLN at this time interrupts the circuit for the transmitter of the telephone handset. This action prevents any interference by speech tones transmitted over the communication channel with the remote control system operation, that is, with the transmission of the various tone pulses in each direction. Timer relay TLTM is also deenergized by opening of front contact *a* of relay TLN and the timer relay releases quickly, once again closing its back contact *a*.

At the station location, montior relay MR is reenergized in response to the resumption of transmission of the $f_5$ tone current. Relay MR picks up to open its back contact *a* which deenergizes relay FTLN. When this latter relay releases, the opening of its front contact *a* interrupts the inhibit circuit for the tone transmitters which resume operation. Likewise, the closing of back contact *b* of relay FTLN prepares the keying circuit for the $f_6$ tone transmitter for control by the telemeter transmitter. However, it is to be noted that relay HSP at the office remains energized during this period so that its open back contact *f* prevents any operation by the telemeter receiver to receive information from the remote station. This is necessary since insufficient time would be available for a proper transmission of telemeter indications. The opening of front contact *c* of relay FTLN interrupts the circuit for the transmitter of the telephone handset at this station, further assuring that there can be no interference with the transmissions of the remote control system by speech tones.

At the office location, with relay TLTM released, the inhibit circuit for the office scanning control apparatus is again complete. Thus, when a single scanning cycle completes, the apparatus operation is halted on the last step of the scanning cycle and relay ES is again energized and picks up. As before, the closing of front contact *a* of relay ES completes the inhibit circuit for halting the transmission of the various tone currents from the office. Relay TLN is again energized by the closing of front contact *b* of relay ES and picks up. The telephone apparatus network is again reactivated by the closing of the various front contacts of relay TLN. In addition, relay TLTM is again energized to time another selected period of telephone operation. Such cycling action obviously will repeat at the end of each timing period of relay TLTM, thus allowing telephone conversation to occur and yet permitting the remote control system to periodically up date the information stored and registered at the office location as received from the various field stations. It is obvious, of course, that the cycling action at the field station follows that at the office which is the controlling location. Said in another way, at periodic intervals established by the operation of relay TLTM, the telephone network operation is interrupted to interpose a single scanning cycle of the remote control system. During this cycle, changed in indications and alarms are transmitted from the various field stations, received at the office, and stored and registered for the information of the system operator. Thus, no vital alarm indication can be delayed for a period any longer than the cycle of operation of relay TLTM.

Let us assume now that a maintainer at the station shown in FIG. 2 desires to talk with the system operator at the control office. To initiate this operation, he removes the telephone handset from the hook switch at his station location. When switch FHS is released, it closes its upper contacts. The telephone set receiver is immediately connected through the hybrid network to the communication channel over upper contacts *a* and *b* of switch FHS. Upper contact *c* of this hook switch prepares a circuit for the telephone transmitter. However, this circuit is open at front contact *c* of relay FTLN and can not be actuated by the operation of the push-to-talk button FPTB at this time. Upper contact *d* of switch FHS actuates the transmission of a telephone call request indication to the office location as previously described.

At the office, reception of this telephone call request indication energizes relay TLCLA. The pickup of relay TLCLA is followed by the energization and pickup of relay TLCLB. Indication lamp TCEK is illuminated and an alarm sounds to call the attention of the system operator to the phone call request. Relay TLCLA is held in its energized condition until the alarm silence pushbutton ASPB is operated or until relay HSP picks up. The system operator acknowledges the reception of this indication by removing his telephone handset from the hook switch to initiate the changeover action to the telephone network. The details of this changeover action under these circumstances are identical with those previously described when the system operator initiated the action by removing his handset to originate a call to a station. The only difference is that bell signals are not transmitted from the office and the station action is completed when relay FTLN picks up since the local station maintainer has already removed the handset at his location. The periodic cycling action, by which the remote control channel is made active for a single scanning cycle, followed by a return to the telephone network, continues as long as the telephone handsets are kept removed from the corresponding hook switches. It is obvious that the personnel using the telephone network will reailze when the cycling operation of returning the remote control system to the channel has occurred since they will hear in their telephone receivers the various tone pulses being transmitted during this remote control scanning cycle. In addition, they will be unable to converse since their telephone transmitters will be disconnected from the communication channel.

This arrangement of my invention thus provides for coordinating the use of a common communication channel by a remote control system and a telephone network, each operating by currents in the voice frequency range. A usable maintenance telephone circuit is thus available without requiring a separate and distinct channel. The circuit arrangement is relatively simple and requires only a few special or extra actions by the system operator to actuate the changeover to the telephone network. Normally the remote control system, of the continuously scanning type, is active and control and indication functions may be transmitted without special concern on the part of the operator. The coordination system is economical since most of the apparatus used is required either by the remote control system or by the telephone network in any event. A small amount of additional supervisory apparatus at the office is required. Primarily, four relays, including those responsible for the reception of the telephone call request, are needed to control the changeover action and the cycling operation. At each of the remote station locations, only two additional relays are required. A simple, economical, and easily operated arrangement is thus provided for coordinating the use of the single voice frequency channel by the two types of systems.

Although I have herein shown and described but one form of an arrangement embodying my invention for coordinating the use of a common communication channel by a remote control system and a telephone network, it is to be understood that various changes and modifications may be made therein within the scope of the appended claims without departing from the spirit and scope of my invention.

Having thus described my invention, what I claim is:

1. A dual communication system extending between a control office location and a plurality of remote station locations connected by a communication channel, comprising, (a) a plurality of carrier current transmitters of the voice frequency range, at least one at each location, each transmitter connected to said communication channel, (b) control apparatus at each location with connections for keying a corresponding transmitter to transmit information between said office and each station in continuously repeated scanning cycles, (c) telephone apparatus at each location normally disconnected from said channel and capable of transmitting and receiving speech when connected, (d) a control switch at said office operable at selected times for initiating the connection of the corresponding telephone apparatus to said channel, (e) transfer relay means at said office controlled by said control switch for completing the channel connections of the office telephone apparatus, (f) an inhibit circuit means at said office controlled by said relay means for halting the scanning operation of the office control apparatus and the operation of the office transmitters, (g) a monitor means at each station with connections to said channel for detecting the reception of continued transmissions from said office, (h) an inhibit means at each station controlled by the corresponding monitor means for halting all transmissions from that station when said monitor means detects a continued absence of transmissions from said office, (i) another control switch at each station operable when telephone use is desired for completing the connections of that station telephone apparatus to said channel, when that station inhibit means is active, (j) a signaling means at each station controlled by the associated switch and with connections to the associated control apparatus for transmitting a telephone call request to said office when said associated switch is operated.

2. A dual communication system extending between a control office location and a plurality of remote station locations connected by a communication channel, comprising, (a) a plurality of carrier current transmitters of the voice frequency range, at least one at each location, each transmitter connected to said communication channel, (b) control apparatus at each location with connections for keying a corresponding transmitter to transmit information between said office and each station in continuously repeated scanning cycles, (c) telephone apparatus at each location normally disconnected from said channel and capable of transmitting and receiving speech when connected, (d) a control switch at said office operable for initiating the connection of the corresponding telephone apparatus to said channel, (e) an inhibit circuit means at said office controlled by said switch in its operated position for halting the scanning operation of the office control apparatus and the transmission of carrier current by the office transmitters, (f) transfer relay means at said office controlled by said control switch in its operated position and by said control apparatus in its inhibited condition for completing the channel connections of the office telephone apparatus, (g) a monitor means at each station with connections to said channel for detecting the reception of carrier current transmitted from said office, (h) an inhibit means at each station controlled by the corresponding monitor means when continued absence of carrier current transmission from said office is detected for halting all transmissions from that station and for preparing channel connections for that station telephone apparatus, (i) another control switch at each station operable when telephone use is desired for completing the connections of that station telephone apparatus to said channel when said station inhibit means is active, (j) a timing means at said office actuated by said transfer relay means when the office telephone channel connections are complete for periodically restoring the associated control apparatus and transmitters to their active condition for a single scanning cycle at preselected intervals.

3. Coordination apparatus for a voice frequency continuously scanning remote control system and a telephone network using a common communication channel connecting the control office and a plurality of remote station locations of said system, said system being normally active and said telephone network being normally inactive, comprising in combination, (a) a contact means at said office manually operable to a selected position for requesting use of said telephone network and for initiating the connection of said network to said channel, (b) a line connection relay at said office also operable to a selected position, (1) an operating circuit for said line connection relay jointly controlled by said contact means in its selected position and by said remote control system at the end of each scanning cycle, (2) said relay controlling said telephone network to complete the connections to said channel, (c) an inhibit means at said office jointly controlled by said contact means in its selected position and by said remote control system in its end of scanning cycle condition for halting all scanning and transmission operation by the office apparatus of said remote control system, (d) monitor means at each station connected to said channel and responsive to said remote control system for detecting the inhibited condition of said system at said office, (e) inhibit means at each station controlled by the corresponding monitor means for initiating the activation of the telephone network at that station and for inhibiting remote control system transmissions from that station, (f) signal receiving means at each station connected to said channel for receiving a manually actuated call signal transmitted from said office, (g) contact means at each station manually operable to a selected position for completing the connection of the station telephone network to said channel when the associated station inhibit means is in its inhibiting condition, (h) timing means at said office controlled by said line connection relay in its selected position for interrupting the telephone network connections at preselected intervals and for actuating a signal scanning cycle by said remote control system.

4. A coordination arrangement, for a voice frequency, continuously scanning remote control system and a telephone network using jointly a common communication channel, said system and said network including a control office and a plurality of remote stations connected by said channel, said remote control system being normally active and said telephone network being normally disconnected, comprising in combination, (a) a control switch means at said office operable from a first to a second position to initiate transfer from said remote control system to said telephone network, (b) a relay means controlled by said office control switch for operating to a preselected condition in response to the operation of said switch to its second position, (c) another relay jointly controlled by said system and said relay means for operating to a selected position at the end of a scan cycle when said relay means is in its preselected condition, (d) transfer circuits at said office controlled by said other relay in its selected position and by said relay means in its preselected condition for connecting the portion of said telephone network at said office to said channel, (e) inhibit circuit means at said office controlled by said relay means in its preselected condition and said other relay in its selected position for halting the operation of said system beyond the end of the next scan cycle for a predetermined period and for transmitting a preselected signal to said stations, (f) a monitor means at each station having control connections to said channel for detecting the reception of said preselected signal from said office, (g) an inhibit means at each station controlled by said monitor means for halting transmission by said system from that station when said preselected signal is received, (h) a control switch means at each station operable between a first position and a second position, (i) transfer circuit means at each station controlled by the associated station inhibit means and control switch means for connecting the telephone network at that station to said channel when said preselected signal is received and that station control switch is operated to its second position, (j) a signaling means at each station responsive to the operation of the associated control switch to its second position for actuating the transmission of a telephone call request to said office by said remote control system.

5. A coordination arrangement, for a voice frequency, continuously scanning remote control system and a telephone network using jointly a common communication channel, said system and said network including a control office and a plurality of remote stations connected by said channel, said remote control system being normally active and said telephone network being normally disconnected, comprising in combination, (a) a control switch means at said office operable from a first to a second position to initiate transfer from said remote control system to said telephone network, (b) a relay means controlled by said office control switch for operating to a preselected condition in response to the operation of said switch to its second position, (c) another relay having a released and an operated position, (d) an operating circuit jointly controlled by said system and said relay means for actuating said other relay to its operated position at the end of a scan cycle when said relay means is in its preselected condition, (e) a timing relay controlled by said other relay in its operated position for timing a predetermined interval, (1) said timing relay having a timing position normally occupied and an operated position occupied at the end of said predetermined interval, (f) transfer circuit means at said office jointly controlled by said other relay in its operated position and by said relay means in its preselected condition for connecting the office portion of said telephone network to said channel, (g) inhibit circuit means at said office controlled by said relay means in its preselected condition and said timing relay in its timing position for halting the operation of said system beyond the end of the scan cycle for said predetermined interval to transmit a preselected signal to said stations, (h) a monitor relay at each station having control connections to said channel for detecting the reception of said preselected signal from said office, (i) an inhibit means at each station controlled by said monitor relay for halting transmission by said system from that station when said preselected signal is received, (j) a control switch means at each station operable between a first position and a second position, (k) transfer circuit means at each station controlled by the associated station inhibit means and control switch means for connecting the telephone network at that station to said channel when said preselected signal is received and that station control switch is operated to its second position, (l) a signaling means at each station responsive to the operation of the associated control switch to its second position for actuating the transmission of a telephone call request to said office by said remote control system.

6. A dual communication system extending between a control office and a plurality of remote station locations connected by a communication channel, comprising in combination, (a) a plurality of normally active carrier current transmitters, at least one at each location, each connected to said communication channel, (b) normally active control apparatus at each location connected for keying the associated transmitter to transmit information between that location and at least one other location, (c) normally inactive telephone apparatus at each location capable of transmitting and receiving speech when connected to said channel, (d) a control switch at said office operable at selected times for initiating a reversal of the active and inactive conditions of said control and telephone apparatus, (e) an inhibit circuit at said office controlled by said control switch and connected for halting the keying action of the office control apparatus at a preselected position when said switch is in its operated condition, (f) a second inhibit circuit at said office controlled by said control switch and said control apparatus and connected for holding the associated carrier transmitters in an inactive state while said switch is in its operated condition and the keying action of said control apparatus is halted, (g) a connection relay controlled by said control switch and said control apparatus for completing the connections of said telephone apparatus to said communication channel when said control switch is in its operated position and the keying action of said control apparatus is halted, (h) a monitor relay at each station with connections to said channel for detecting the reception of keyed carrier current from said office, (i) an inhibit means at each station having connection to the associated transmitter and controlled by the corresponding monitor relay for halting carrier current transmission when said corresponding monitor relay detects continued non-reception of carrier from said office, (j) a control switch at each station operable when use of the telephone apparatus at that station is desired, (k) circuit means at each station jointly controlled by the station inhibit means and control switch for connecting that station telephone apparatus to said channel when that control switch is in its operated position and that inhibit means is active to halt carrier current transmission, (l) a timing means at said office controlled by said connection relay for periodical restoring said control apparatus and said transmitters to an active condition for a preselected interval.

References Cited

UNITED STATES PATENTS

| | | | |
|---|---|---|---|
| 3,122,723 | 2/1964 | Coley et al. | 340—163 |
| 3,268,662 | 8/1966 | Jackel | 179—2 |

JOHN W. CALDWELL, *Acting Primary Examiner.*

ROBERT L. GRIFFIN, *Examiner.*

J. T. STRATMAN, *Assistant Examiner.*